United States Patent
Müller et al.

(10) Patent No.: US 10,939,306 B2
(45) Date of Patent: Mar. 2, 2021

(54) METHOD AND APPARATUS FOR CONTROLLING BEAM TRANSMISSION TO GROUPED USER EQUIPMENT (UES)

(71) Applicant: TELEFONAKTIEBOLAGET LM ERICSSON (PUBL), Stockholm (SE)

(72) Inventors: Walter Müller, Upplands Väsby (SE); Rasmus Axén, Linköping (SE); Thomas Walldeen, Linköping (SE); Patrik Karlsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 16/064,007

(22) PCT Filed: Dec. 23, 2015

(86) PCT No.: PCT/IB2015/059938
§ 371 (c)(1),
(2) Date: Jun. 20, 2018

(87) PCT Pub. No.: WO2017/109549
PCT Pub. Date: Jun. 29, 2017

(65) Prior Publication Data
US 2019/0007844 A1    Jan. 3, 2019

(51) Int. Cl.
*H04W 16/28* (2009.01)
*H04W 76/28* (2018.01)
(Continued)

(52) U.S. Cl.
CPC .......... *H04W 16/28* (2013.01); *H04B 7/0617* (2013.01); *H04W 4/08* (2013.01);
(Continued)

(58) Field of Classification Search
CPC ..... H04W 16/28; H04W 68/02; H04W 72/14; H04W 76/28
See application file for complete search history.

(56) References Cited

U.S. PATENT DOCUMENTS

2009/0225883 A1*  9/2009  Orlik ................... H04W 72/046
                                                                                 375/260
2010/0208660 A1*  8/2010  Ji ....................... H04W 52/0225
                                                                                 370/328

(Continued)

FOREIGN PATENT DOCUMENTS

WO    WO-2011150549 A1 * 12/2011    ........... H04B 7/0621

OTHER PUBLICATIONS

Motorola, Improving VoIP performance for HSDPA by reduced HS-SCCH or by in-band control signalling with grouping, 3GPP TSG RAN WG1#46, R1-062422, Tallinn, Estonia, Aug. 28-Sep. 1, 2006.

(Continued)

*Primary Examiner* — Charles C Jiang
*Assistant Examiner* — Voster Preval
(74) *Attorney, Agent, or Firm* — Sage Patent Group

(57) ABSTRACT

A method and radio access node for controlling beam transmission from a radio access node. The method identifies a number of user equipment (UEs) associated with a same beam set and groups the identified UEs into one or more corresponding groups. The method assigns a same discontinuous reception (DRX) phase to the UEs in each corresponding group, and coordinates transmission from the beam set to UEs in the one or more corresponding groups based on the assigned DRX phase.

19 Claims, 4 Drawing Sheets

(51) Int. Cl.
*H04W 72/14* (2009.01)
*H04W 68/02* (2009.01)
*H04B 7/06* (2006.01)
*H04W 4/08* (2009.01)

(52) U.S. Cl.
CPC .......... *H04W 68/02* (2013.01); *H04W 72/14* (2013.01); *H04W 76/28* (2018.02)

(56) References Cited

U.S. PATENT DOCUMENTS

| | | |
|---|---|---|
| 2012/0027111 A1 | 2/2012 | Vook et al. |
| 2014/0220975 A1* | 8/2014 | Makharia .............. H04W 48/20 |
| | | 455/436 |
| 2014/0225775 A1* | 8/2014 | Clevorn ................. H01Q 3/34 |
| | | 342/372 |
| 2016/0192433 A1* | 6/2016 | Deenoo ............... H04W 72/046 |
| | | 370/329 |
| 2016/0286604 A1* | 9/2016 | Heo .................. H04W 52/0216 |
| 2017/0257155 A1* | 9/2017 | Liang .................. H04L 25/0202 |
| 2018/0241533 A1* | 8/2018 | Loehr ................. H04W 72/042 |
| 2019/0081751 A1* | 3/2019 | Miao ..................... H04B 7/024 |
| 2020/0296790 A1* | 9/2020 | Jha ........................ H04W 76/28 |

OTHER PUBLICATIONS

Panasonic, Techniques for efficient small cell operation, 3GPP Tsg Ran WG1 Meeting #72, R1-130690, St. Julian's, Malta, Jan. 28-Feb. 1, 2013.

\* cited by examiner

METHOD AND APPARATUS FOR CONTROLLING BEAM TRANSMISSION TO GROUPED USER EQUIPMENT (UES)

This application is a 371 of International Application No. PCT/IB2015/059938, filed Dec. 23, 2015, the disclosure of which is fully incorporated herein by reference.

TECHNICAL FIELD

The present disclosure relates to a method and radio access node for controlling beam transmissions, and in particular, beam transmissions to UEs grouped together based on certain criteria.

BACKGROUND

Communication devices such as User Equipment (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The communications network covers a geographical area which is divided into cells, wherein each cell is being served by one or more transmission points. A cell is a geographical area where radio coverage is provided by one or more transmission points. One or more cells may also have an overlapping cell area. A cell may provide coverage to all UE's in an area adjacent to other cells' coverage areas, whereas a beam only provides coverage to a subset of UEs in a cell, and typically to a subset of the area covered by a cell. Cells may use one Radio access technology and beams may use another Radio access technology or the same. The non-limiting terms, cells and beams, may be used interchangeably to indicate the coverage provided to a UE.

Long-Term Evolution (LTE) cells transmit Cell Reference Signal (CRS) in the downlink to allow for synchronization, channel state estimation, identification and measurements etc. The cell-specific reference signal is the most basic downlink reference signal, which is transmitted in some standardized subframe(s) and in some standardized Resource Elements (REs) in the frequency domain, thus it can cover the entire cell bandwidth. For cell identification, Physical Cell Identity (PCI) is used, which is a limited resource and typically needs to be re-used. For example, in LTE there are 504 different PCI's possible to allocate per frequency layer. In LTE, there are also other reference signals defined. For example, beams also transmit Reference Symbols in the downlink, in this description called Beam Reference Symbols (BRS) for controlling the beam, Channel State Information Reference Symbols (CSI-RS) and Mobility Reference Signals (MRS), for more or less the same purposes as CRS and PCI. To control a beam width and direction, typically several antenna points are arranged in an array and the power, phase, and BRS allocation is controlled for each antenna point.

A typical handover evaluation for coverage-triggered handover in Radio Resource Connection (RRC) Connected mode uses downlink measurements performed on a Cell Reference Signal (CRS) by the UE, and identification performed on PCI by the UE, and event-triggered measurement reporting. For example, the radio access scheme for Long Term Evolution (LTE) triggers downlink measurement reporting based on two parameters associated with a reference signal—Reference Signal Received Power (RSRP) and Reference Signal Received Quality (RSRQ). A mobile terminal performs the downlink measurements when the mobile terminal is in RRC Connected and in RRC Idle mode.

Current radio access schemes also allow UEs to use Discontinuous Reception (DRX) both in RRC Idle mode and RRC Connected mode. The time a UE is available for paging and/or scheduling during a DRX cycle is referred to as UE "active time" or "active time occasion". Typically, active time occasions are also used by the UE to perform measurements and report measurements in order to support mobility, such as, handovers. A UE operating in DRX mode may only measure a reference signal, e.g. CRS, and perform identification verification, e.g. by using the related PCI, during a part of the DRX cycle, e.g., just before, after or during the UE's active time.

The configuration of DRX schemes in a radio access network typically make sure that the active time occasion for a number of UE's are spread out in time even if the UE's are using the same DRX cycle so not all UE wakes up at the same time instance. The absolute time instance a certain UE or a group of UE's wakes up is called DRX phase.

In future radio access schemes, transmissions to UEs may be provided according to resources defined for a cell, sector, antenna beam or beam set, or resources that may be defined for providing coverage to any area of a cell. A beam may not cover all UE's in a cell; however, beams may be used to extend coverage for selected UE's. To support high speed UEs with as little UE-to-network signaling as possible, schemes where cells/beams follow the UE may be provided, rather than requiring the UE to change cell/beam via handover.

A goal of 5G systems is "lean carrier" radio access. "Lean carrier" implies that cells or beams are not transmitting anything unless there is a communication session with one or more UE's. Lean Carrier reduces, or makes lean, the level of reference signaling needed for proper network performance, which leads to a corresponding improvement of the downlink data speed that applies to all parts of the LTE network, with the highest performance gains occurring in the areas with most cell overlap. It is noted that in WCDMA, there are events already defined to support maintenance of an active set of cells that allow a UE to only send measurements reports when the UEs active set needs to be changed.

Existing solutions for cell/beam based mobility are handled on a per UE basis which may not be an efficient use of resources and power.

SUMMARY

This disclosure describes a radio access node (e.g., eNode B) and method for controlling beam transmission by grouping of User Equipment (UEs). Advantageous embodiments of the radio access node (e.g., eNode B) and related method are further described in this disclosure.

In a first aspect, the present disclosure provides a method of controlling beam transmission from a radio access node. The method comprises identifying a number of user equipment (UEs) associated with a same beam set, grouping the identified UEs into one or more corresponding groups, assigning a same discontinuous reception (DRX) phase to the UEs in each corresponding group, and coordinating transmission from the beam set to UEs in the one or more corresponding groups based on the assigned DRX phase. In another embodiment, coordinating transmission from the beam set based on the assigned DRX phase comprises transmitting to the UEs in the group coinciding with the active time of the DRX phase. In another embodiment, the transmission comprises reference signals, paging, downlink (DL) scheduling information, and or uplink (UL) scheduling grant information. In another embodiment, identifying a number of UEs associated with the same beam set comprises identifying: a number of UEs associated with a same active/monitored set of beams, moving at high speed requiring wider beams, a number of UEs requiring narrower beams, a number of UEs using a same WiFi access point, a number of high-speed UEs using cells/beams that move with the UEs, a number of UEs that perform frequent measurement reporting, a number of UEs using a same radio access technology, or a same set of frequencies and/or cell/beams for carrier aggregation or dual connectivity, a number of UEs requiring longer beam transmission times, a number of UEs requiring longer DRX active times, or a number of UEs that perform tracking area registration at the same time. In yet another embodiment, the radio access node transmits using Discontinuous Transmission (DTX).

In a second aspect, a radio access node for controlling beam transmission comprises a processor and a memory. The processor is configured to execute instructions in the memory which cause the radio access node to identify a number of user equipment's (UEs) associated with a same beam set, group the identified UEs into one or more corresponding groups, assign a same discontinuous reception (DRX) phase to the UEs in each corresponding group, and coordinate transmission from the beam set to UEs in the one or more corresponding groups based on the assigned DRX phase. In another embodiment, the processor is further configured to coordinate transmission from the beam set based on the assigned DRX phase by transmitting to the UEs in the group coinciding with the active time of the DRX phase. In another embodiment, the transmission comprises reference signals, paging, downlink (DL) scheduling information, and/or uplink (UL) scheduling grant information. In another embodiment, the processor is further configured to identify a number of UEs associated with the same beam set by identifying: a number of UEs associated with a same active/monitored set of beams, moving at high speed requiring wider beams, a number of UEs requiring narrower beams, a number of UEs using a same WiFi access point, a number of high-speed UEs using cells/beams that move with the UEs, a number of UEs that perform frequent measurement reporting, a number of UEs using a same radio access technology, or a same set of frequencies and/or cell/beams for carrier aggregation or dual connectivity, a number of UEs requiring longer beam transmission times, a number of UEs requiring longer DRX active times, or a number of UEs that perform tracking area registration at the same time. In yet another embodiment, the radio access node transmits using Discontinuous Transmission (DTX).

In a third aspect of the disclosure, a system for controlling beam transmission comprises a radio access node and one or more user equipment (UEs). The radio access node is configured to identify a number of UEs associated with a same beam set from the one or more UEs, group the identified UEs into one or more corresponding groups, assign a same discontinuous reception (DRX) phase to the UEs in each corresponding group, and coordinate transmission from the beam set to UEs in the one or more corresponding groups based on the assigned DRX phase. In another embodiment, the radio access node is further configured to coordinate transmission from the beam set based on the assigned DRX phase by transmitting to the UEs in the group coinciding with the active time of the DRX phase. In another embodiment, the transmission comprises reference signals, paging, downlink (DL) scheduling information, and/or uplink (UL) scheduling grant information. In another embodiment, radio access node is further configured to identify a number of UEs associated with the same beam set by identifying: a number of UEs associated with a same active/monitored set of beams, a number of UEs moving at high speed requiring wider beams, a number of UEs requiring narrower beams, a number of UEs using a same WiFi access point, a number of high-speed UEs using cells/beams that move with the UEs, a number of UEs that perform frequent measurement reporting, a number of UEs using a same radio access technology, or a same set of frequencies and/or cell/beams for carrier aggregation or dual connectivity, a number of UEs requiring longer beam transmission times, a number of UEs requiring longer DRX active times, or a number of UEs that perform tracking area registration at the same time. In yet another embodiment, the radio access node transmits using Discontinuous Transmission (DTX).

In a fourth aspect of the disclosure, a non-transitory computer-readable medium comprises instructions which when executed by a processor, cause a radio access node to identify a number of user equipment (UEs) associated with a same beam set, group the identified UEs into one or more corresponding groups, assign a same discontinuous reception (DRX) phase to the UEs in each corresponding group, and coordinate transmission from the beam set to UEs in the one or more corresponding groups based on the assigned DRX phase.

Additional aspects of the invention are provided for a computer program and a computer program product for performing the above methods, as will be set forth, in part, in the detailed description, figures and any claims which follow, and in part will be derived from the detailed description. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

It would be advantageous for a radio access node to transmit to UEs as a group, particularly when the UEs are associated with the same beam set, in order to support "lean carrier" transmission from a radio access node. UE grouping refers to grouping UEs associated with a same cell/beam set. For example, a radio access node that transmits in Discontinuous Transmission (DTX) on a cell/beam would more efficiently use its resources if its transmissions on the cell/beam were coordinated with a group of UEs communicating with the same cell/beams, rather than on a per UE basis. Further, existing solutions for cell/beam-based mobility do not provide a way to coordinate cell/beam DTX transmissions with UE measurement reporting, UE DRX phase, UE active time length, and UE grouping in order to allow high performance mobility and allow for narrow beams and lean carrier usage.

It would be advantageous for a radio access node to group UEs associated with a same beam set in such a manner that the time a particular beam and/or beam set needs to transmit is minimized. It would be further advantageous to allocate the same DRX phase and UE measurement periods for the UEs in each group in such a manner that the time a UE needs to be available for paging and/or scheduling, and for performing measurements is also minimized. In an embodiment of the present disclosure, UEs using the same set of cells/beams may be grouped together in one or more groups and the UEs within each group are assigned to use the same DRX phase within the group.

Figure 1:
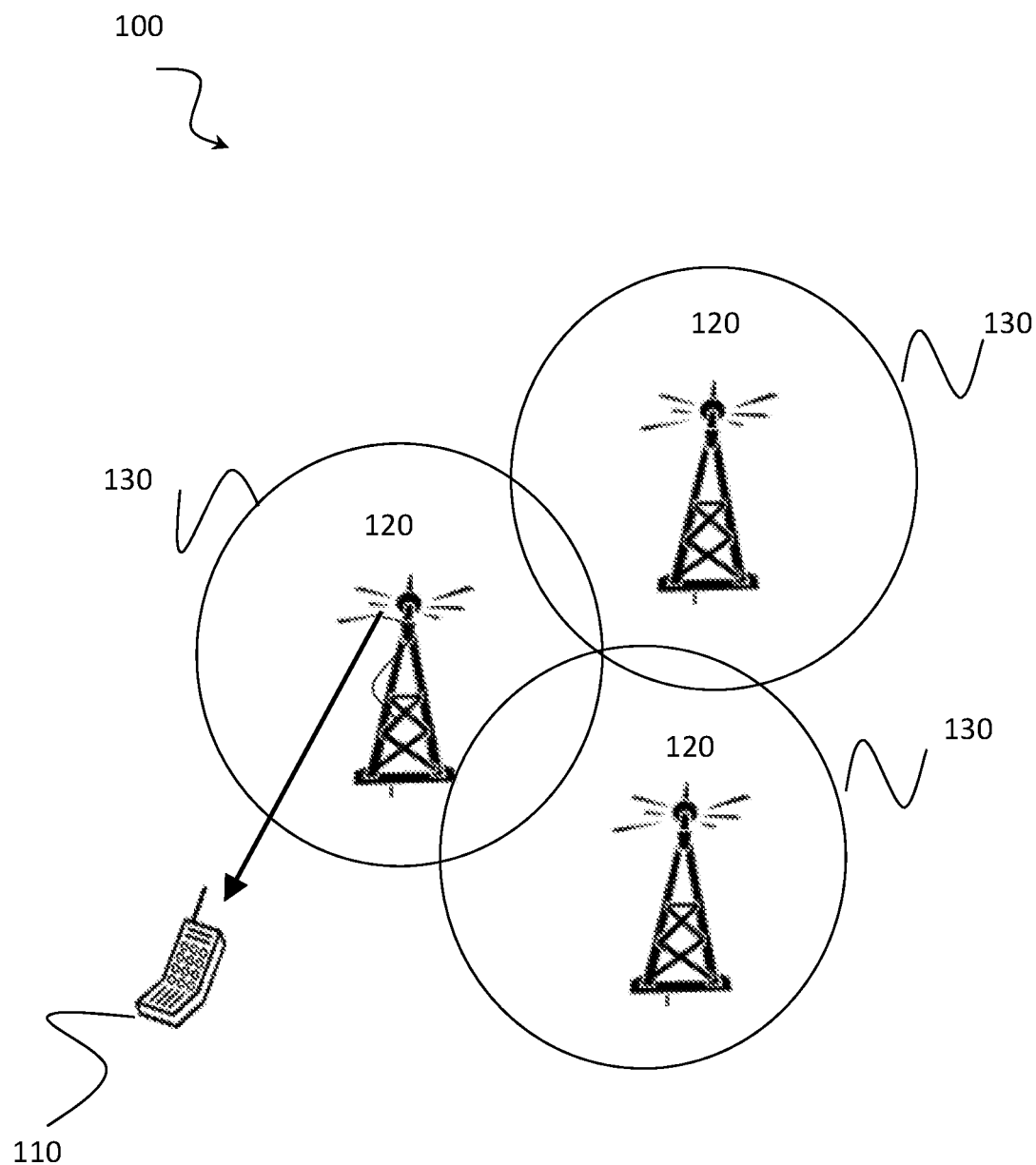
FIG. 1 is an example of a network suitably operative in accordance with certain embodiments.

An exemplary wireless communication network 100 is provided in FIG. 1. The wireless communications network 100 includes one or more wireless communication devices 110, one or more radio access nodes 120, and/or other suitable nodes (not shown). Radio access node 120 communicates with wireless device 110 over a wireless interface. For example, radio access node 120 transmits wireless signals to and/or receives wireless signals from wireless communication device 110. The wireless signals contain voice traffic, data traffic, control signals, and reference signals, for example. Radio access node 120 may provide coverage to wireless device 110 in a particular geographical area 130, e.g., a cell, sector, or antenna beam, which non-limiting terms may be used interchangeably or in combination throughout this disclosure.

It should also be appreciated that the non-limiting term radio access node is used herein and can refer to any radio network node or network node that provides access to and controls a UE such as the following (for example): a Node B, an access point (AP), an eNode B, a low power node, a femto node, a pico node, a RNC, a network controller, a central controlling node etc. Finally, it should be appreciated that the non-limiting term user equipment (UE) is used herein and refers to any type of wireless communication device 110 that communicates with radio access node in a wireless communication system such as the following (for example): a target device, a device-to-device (D2D) UE, a machine type UE, a UE capable of machine to machine (M2M) communication, a PDA, an iPad, a tablet, a mobile terminal, a smart phone, a laptop embedded equipment (LEE), a laptop mounted equipment (LME), a USB dongle etc.

Certain embodiments of the present disclosure provide solutions for identifying UEs associated with a same beam set, and grouping the UEs.

Figure 2:
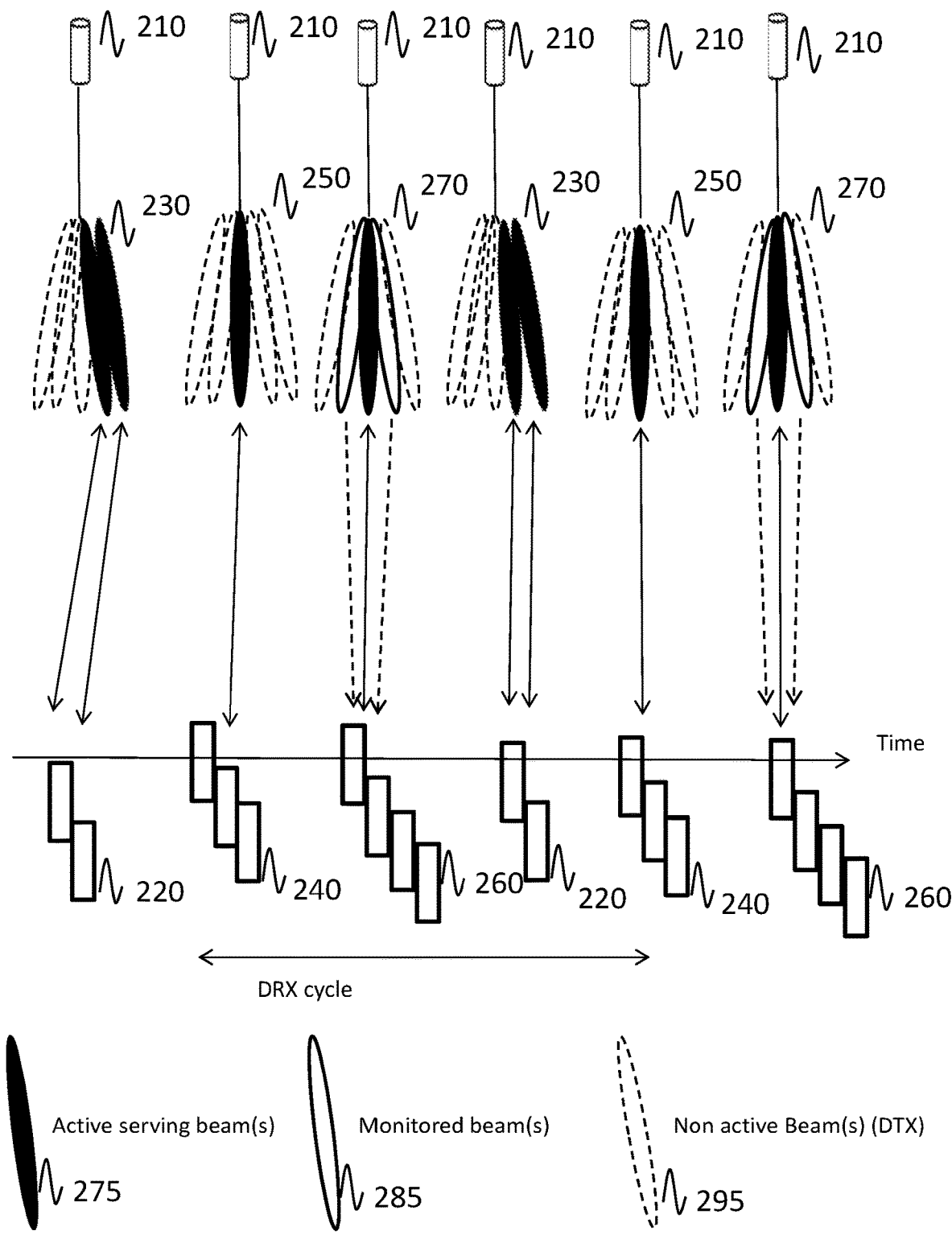
FIG. 2 is a diagram illustrating an exemplary beam transmission.

FIG. 2 provides an exemplary grouping of UEs which are associated with particular beam set. In an embodiment, radio access node 210 is communicatively coupled to one or more UEs, 220, 240, 260. In an embodiment, radio access node 210 communicates with one or more UEs 220, 240, 260, respectively, over one or more antenna beams. In various embodiments, antenna beams may be active serving beams 275, monitored beams 285, and non-active beams 295. Non-active beams 295 are beams that are in an inactive DTX phase at the radio access node. That is, the radio access node operating in DTX mode does not transmit to or receive transmissions from UEs on non-active beams 295. Active serving beams 275 are beams that are actively transmitting to and/or receiving transmissions from UEs at a radio access node. Finally, monitored beams 285 are beams that are monitored by UE(s) but transmissions are not actively scheduled for UEs on those beams. In an embodiment, the radio access node may transmit a reference signal(s) to UEs on monitored beams 285, but the UE does not have an established communication with the radio access node via a monitored beam 285. In an embodiment, monitored beams 285 may become active beams and therefore, monitored beams 285 may be part of a beam set serving UEs.

In a non-limiting embodiment shown in FIG. 2, a radio access node 210 has, for example, five different antenna beams available for communication. Radio access node 210 may communicate with UEs on all of the available antenna beams or a subset of antenna beams. In an embodiment, an antenna of radio access node 210 may provide coverage to a particular area, e.g., a cell or sector, or a smaller coverage area defined by a subset of antenna beams, which may be referred to as an antenna beam set or beam set, interchangeably.

In current operations, a radio access node 210 is not able to coordinate transmissions according to beam set, or collectively. Rather, radio access node 210 transmits to each UE on a per UE basis. For example, for a UE operating in DRX mode and associated with a particular beam set, radio access node 210 will activate the beam set according to the UE's specific DRX cycle in order to schedule and/or page the UE. However, another UE may be associated with the same beam set but have a different DRX cycle or phase. That is, the UE will wake up at a different time than the first UE. Therefore, radio access node 210 will activate the same beam set once for the first UE and yet again for the second UE according to each UE's DRX phase. Depending on the number of UEs communicating with radio access node 210 and with differing DRX phases, this is a very inefficient use of resources to continuously activate/deactivate the same beam set.

FIG. 2 illustrates grouping UEs associated with a same beam set and further assigning the same DRX cycle to each UE in the group. By assigning the same DRX cycle to all UEs in a group, the UEs will wake up in groups 220, 240, 260, at the same active time occasions according to the DRX cycle assigned to the group. For example, radio access node 210 communicates with UEs in group 220 via a particular beam set 230 comprised of two active beams during the active time corresponding to the DRX phase of group 220. At a different time, radio access node 210 communicates with UEs in group 240 via an antenna beam set 250 comprised of one active beam during the active time corresponding to the DRX cycle of group 240. And yet at another time, radio access node 210 communicates with UEs in group 260 via an antenna beam set 270 comprised of one active beam and two monitored beams during the active time corresponding to the DRX cycle of group 260.

As shown, in an embodiment, radio access node 210 may activate and deactivate beam transmission according to UE groups, which groups have the same DRX phase. Depending on the size of a group of UEs with the same DRX cycle, for example UE group 220, the group may be split into one or more groups with the same DRX cycle, but with a different DRX phase so the active time for each group begins at different times for each separate group. Because the UEs are grouped, a cell or beam set needs to transmit, as a minimum, only when the corresponding UE group has its active time occasions.

Figure 3:
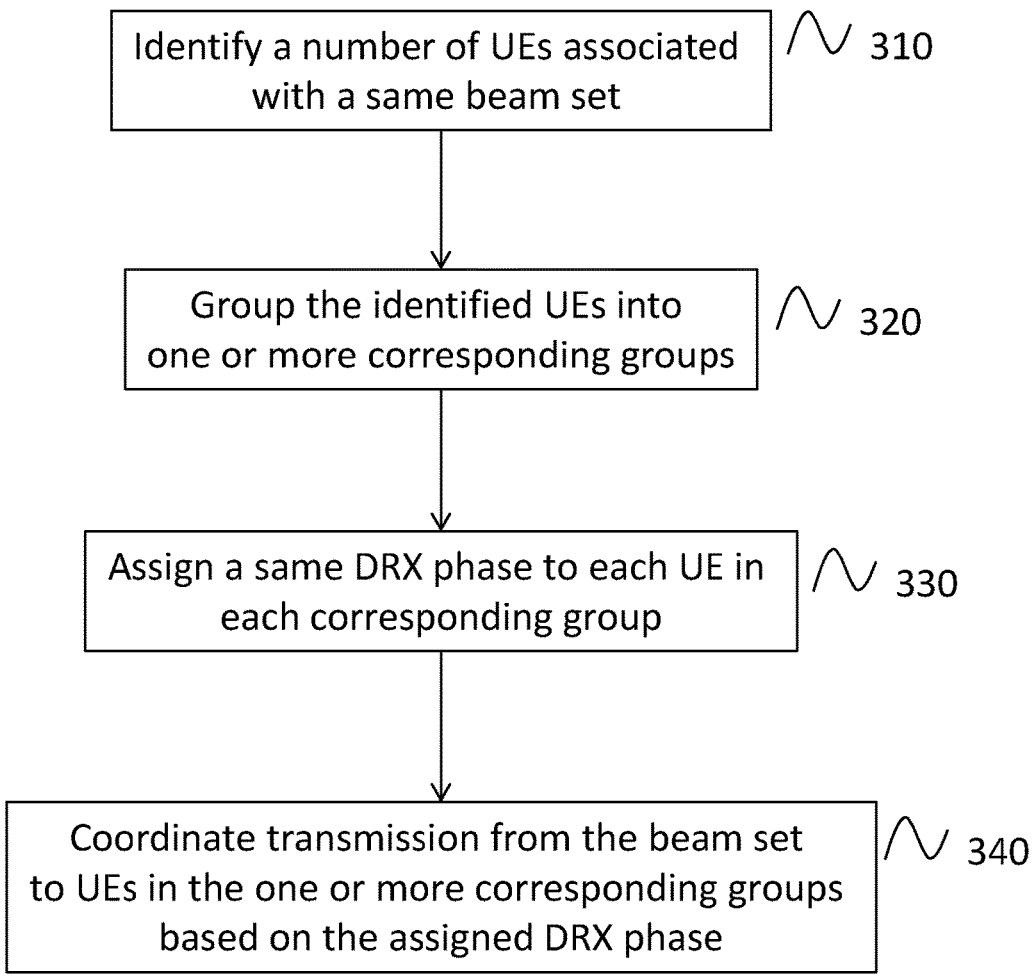
FIG. 3 is a flowchart of a method for controlling beam transmission.

While in exemplary embodiment of FIG. 2, the UEs are grouped by beam set, the radio access node 210 may consider further grouping UEs based on other criteria or needs of the UEs. In particular, UEs may be further grouped together because of the commonality in their current location or position, movement, resources used or required, quality of service required, or radio access technology used. When UEs in a same beam set further operate according to a same or similar criteria, it may be advantageous for a radio access node to treat those UEs similarly by grouping the UEs based on those characteristics. For example, UEs moving at a higher speed may require more signaling with the radio access node, while stationary UEs or UEs moving at a slower speed, may require less signaling. Therefore, it may be advantageous for a radio access node to group the UEs accordingly so it can more efficiently manage UEs having differing signaling needs. There are various other circumstances which may cause UEs to act or behave differently with the radio access node where it would be beneficial to further group the UEs according to those characteristics and/or activity. In some exemplary embodiments, UEs in the same beam set may be further grouped together according to any one or more of the following:
  UEs associated with a same active/monitored set of beams
  UEs moving at high speed requiring wider beams,
  UEs requiring narrower beams,
  UEs using the same WiFi access point,
  high-speed UEs using cells/beams that move with the UEs, which may avoid the overhead of handover
  UEs performing frequent measurement reporting, for example, due to mobility; in an example, UEs may be grouped or spread out in time based on signalling load at the radio access node,
  UEs using a same radio access technology, or a same set of frequencies or cell/beams for carrier aggregation or dual connectivity,
  UEs requiring longer beam transmission times;
  UEs requiring longer DRX active times,
  UEs that perform tracking area registration at the same time,
  a number of UEs using the Intra-Radio Access Technology (RAT) and Inter-RAT access points;
  a number of UEs using the core network instance or slice;
  a number of UEs with the same quality of service demands; or
  a number of UEs providing positioning information FIG. 3 is an exemplary method 300 performed by a radio access node to group UEs. In 310, a radio access node 210 identifies a number of UEs associated with a same beam set. Next, at 320, the radio access node 210 groups the identified UEs into one or more corresponding groups. For example, depending on the number of UEs identified which may be grouped together (which represents the default group size), capacity of the radio access network, and other criteria, the radio access node may split the identified UEs into multiple groups. At 330, the radio access node assigns a same DRX phase to each UE in each corresponding group. In an exemplary embodiment, the UE groups are assigned the same DRX cycle but each UE group has a different DRX phase so not all UEs in all groups wake up at the same time. Thus, all UEs in a first group will be assigned a first DRX phase, all UEs in a second group will be assigned a second DRX phase, etc. Then, at 340, a radio access node coordinates transmission from the cell/beam set to UEs in the one or more corresponding groups based on the assigned DRX phase.

In an embodiment, when the radio access node coordinates transmissions from the beam set based on the assigned DRX phase, the radio access node handles transmissions to/from the UEs in the group coinciding with the active time of the DRX phase of the UEs in the group. The types of transmission that may occur may include, for example, transmitting reference signals, paging requests, downlink (DL) scheduling information, and/or uplink (UL) scheduling grant information. The radio access node may further transmit using discontinuous reception (DTX). Thus, the radio access node is able to handle transmissions to/from multiple UEs associated with the same beam set to coincide with the same DRX phase, which advantageously provides for efficient use of the radio access node's resources.

A radio access node may perform the above method periodically in order to update the UE groups, as necessary, for example, due to mobility of UEs, changes in a UE's active beam set, etc. Thus, the radio access node advantageously efficiently uses the resources for communicating with groups of UEs with similar needs, and in particular, UEs associated with a same beam set, rather than on a per UE basis.

Figure 4:
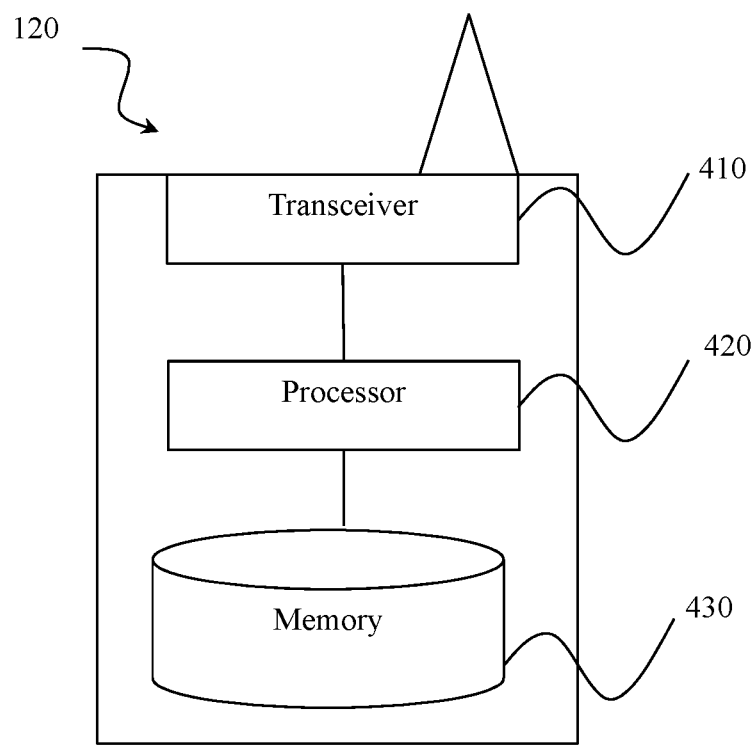
FIG. 4 is an example of a radio access node suitably operative in accordance with certain embodiments.

FIG. 4 is an example of a network device 120 suitably operative in accordance with certain embodiments. Examples of the network node include a an access point, a radio access point, a base station, a base station controller, an eNodeB (eNB), or other device that can provide wireless communication or transmit CSI-RS within a cell/sector. A network node interface may comprise any entity capable of at least receiving or transmitting radio signals within a radio network and/or cell/sector, or both. The network node comprises transceiver 410, processor 420, and memory 430. In some embodiments, transceiver 410 facilitates transmitting wireless signals to and receiving wireless signals from a user equipment (UE) 110 (e.g., via an antenna), processor 420 executes instructions to provide some or all of the functionality described above as being provided by wireless devices, and memory 430 stores the instructions executed by processor 420.

Processor 420 may comprise any suitable combination of hardware and software implemented in one or more modules to execute instructions and manipulate data to perform some or all of the described functions of the network node. In some embodiments, processor 420 may include, for example, one or more computers, one or more central processing units (CPUs), one or more microprocessors, one or more applications, processing circuitry, and/or other logic.

Memory 430 is generally operable to store instructions, such as a computer program, software, an application comprising one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of the network node may include additional components beyond those shown in FIG. 4 that may be responsible for providing certain aspects of the network node's functionality, including any of the functionality described herein and/or any additional functionality (including any functionality necessary to support the solution described herein).

Particular embodiments of the present disclosure may have one or more advantages. For example, in some embodiments, grouping the UEs according to the one or more criteria, e.g. cell/beam set or other mobility considerations described herein, allows a radio access node 210 to optimize activating and deactivating a cell/beam operating in DTX mode, for a group of UEs rather than on per UE basis. A further advantage is optimization of a UE's DRX phase. For example, UE grouping by DRX phase provides that advantage that the radio access node may transmit reference signals, e.g. CRS and BRS, as seldom as possible because they may be transmitted to a group of UEs simultaneously. Another advantage of UE grouping is that it allows UEs to use efficient DRX when moving at high speed between cells/beams. A further advantage is that grouping allows high speed UEs to get better support when needing wide beams and/or larger active sets. Yet another advantage of UE grouping is that the radio access node may move beams on a group basis, e.g. a group of UEs having the same active time occasions. Certain embodiments may have all, some, or none of these advantages. Other advantages may be apparent to one of ordinary skill in the art.

Modifications, additions, or omissions may be made to the above embodiments and other methods disclosed herein without departing from the scope of the invention. The methods may include more, fewer, or other steps. Additionally, steps may be performed in any suitable order. In certain embodiments, the methods disclosed herein may be implemented as a computer program product. The computer program product comprises a non-transitory computer readable storage medium having computer readable program code embodied in the medium, the computer readable program code comprising computer readable program code to perform the steps of the methods disclosed herein. In certain other embodiments, the methods disclosed herein may be implemented as a non-transitory medium comprising instructions, which when executed by a processor, cause a radio access node to perform the steps of the methods.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. The embodiments described herein may be combined with each other in any way. Although some embodiments have been described with reference to certain radio access technologies, any suitable radio access technology (RAT) may be used, such as long term evolution (LTE) (FDD or TDD), LTE-Advanced, UTRA, UMTS, HSPA, GSM, cdma2000, WiMax, and WiFi. Moreover, various embodiments may support single-RAT or multi-RAT configurations. Accordingly, the above description of the embodiments does not constrain this disclosure. Other changes, substitutions, and alterations are possible without departing from the spirit and scope of this disclosure.

The invention claimed is:

1. A method of controlling beam transmission from a radio access node, comprising:
   identifying a number of user equipments (UEs) associated with a same beam set;
   grouping the identified UEs into two or more groups of UEs, wherein each of the two or more groups of UEs are associated with a different subset of beams of the same beam set;
   assigning a same discontinuous reception (DRX) phase to the UEs in each group of the two or more groups of UEs that are associated with the different subset of beams of the same beam set; and
   coordinating transmission from the same beam set to UEs in the two or more groups of UEs based on the assigned DRX phase for each group of UEs.

2. The method of claim 1, wherein coordinating transmission from the same beam set to the UEs in the two or more groups of UEs based on the assigned DRX phase comprises transmitting to the UEs in each group of UEs during an active time of the DRX phase assigned to the UEs in each group.

3. The method of claim 1, wherein the transmission comprises reference signals, paging, downlink (DL) scheduling information, and/or uplink (UL) scheduling grant information.

4. The method of claim 1, wherein grouping the identified UEs comprises grouping the identified UEs into the two or more groups of UEs according to one or more criteria, the one or more criteria comprising one or more of:
   a number of UEs of the identified UEs being associated with a same active/monitored set of beams;
   a number of UEs of the identified UEs moving at high speed requiring wider beams;
   a number of UEs of the identified UEs requiring narrower beams;
   a number of UEs of the identified UEs using a same Wi-fi access point;
   a number of UEs of the identified UEs performing frequent measurement reporting;
   a number of UEs of the identified UEs using the same set of beams for carrier aggregation;
   a number of UEs of the identified UEs requiring longer beam transmission times;
   a number of UEs of the identified UEs requiring longer DRX active times;
   a number of UEs of the identified UEs performing tracking area registration at the same time; or
   a number of UEs of the identified UEs performing tracking area registration at the same time.

5. The method of claim 1, wherein the radio access node transmits using discontinuous transmission (DTX).

6. A system for controlling beam transmission, comprising:
   a radio access node that communicates with one or more user equipments (UEs), wherein the radio access node is configured to:
      identify a number of UEs associated with a same beam set from the one or more UEs;
      group the identified UEs into two or more groups of UEs, wherein each of the two or more groups of UEs are associated with a different subset of beams of the same beam set;
      assign a same discontinuous reception (DRX) phase to the UEs in each group of the two or more groups of UEs that are associated with the different subset of beams of the same beam set; and coordinate transmission from the same beam set to UEs in the two or more groups of UEs based on the assigned DRX phase for each group of UEs.

7. The system of claim 6, wherein the radio access node is further configured to coordinate transmission from the same beam set to the UEs in the two or more groups of UEs based on the assigned DRX phase by transmitting to the UEs in each group of UEs during an active time of the DRX phase assigned to the UEs in each group.

8. The system of claim 6, wherein the transmission comprises reference signals, paging, and/or scheduling information.

9. The system of claim 6, wherein the radio access node is further configured to group the identified UEs into the two or more groups of UEs according to one or more criteria, the one or more criteria comprising:
- a number of UEs of the identified UEs moving at high speed requiring wider beams;
- a number of UEs of the identified UEs requiring narrower beams;
- a number of high-speed UEs of the identified UEs using cells/beams that move with the UEs;
- a number of UEs of the identified UEs using a same Wi-fi access point;
- a number of UEs of the identified UEs performing frequent measurement reporting;
- a number of UEs of the identified UEs using the same set of beams for carrier aggregation;
- a number of UEs of the identified UEs requiring longer cell/beam transmission times;
- a number of UEs of the identified UEs requiring longer DRX active times; or
- a number of UEs of the identified UEs performing tracking area registration at the same time.

10. The system of claim 6, wherein the radio access node transmits using discontinuous transmission (DTX).

11. A non-transitory computer-readable medium comprising instructions which when executed by a processor of a radio access node that when executed by the processor causes the process to perform operations comprising:
- identifying a number of user equipments (UEs) associated with a same beam set;
- grouping the identified UEs into two or more groups of UEs, wherein each of the two or more groups of UEs are associated with a different subset of beams of the same beam set;
- assigning a same discontinuous reception (DRX) phase to the UEs in each group of the two or more groups of UEs that are associated with the different subset of beams of the same beam set; and
- coordinating transmission from the same beam set to UEs in the two or more groups of UEs based on the assigned DRX phase for each group of UEs.

12. The non-transitory computer-readable medium of claim 11, wherein the operations further comprise:
- coordinating transmission from the same beam set to the UEs in the two or more groups of UEs based on the assigned DRX phase by transmitting to the UEs in each group of UEs during an active time of the DRX phase assigned to the UEs in each group.

13. The non-transitory computer-readable medium of claim 11, wherein the transmission comprises reference signals, paging, downlink (DL) scheduling information, and/or uplink (UL) scheduling grant information.

14. The non-transitory computer-readable medium of claim 11, wherein the transmission includes discontinuous transmission (DTX).

15. The non-transitory computer-readable medium of claim 11, wherein the operations further comprise:
- grouping the identified UEs into the two or more groups of UEs according to a number of UEs moving at high speed requiring wider beams.

16. The non-transitory computer-readable medium of claim 11, wherein the operations further comprise grouping the identified UEs into the two or more groups of UEs according to a number of UEs requiring narrower beams.

17. The non-transitory computer-readable medium of claim 11, wherein the operations further comprise grouping the identified UEs into the two or more groups of UEs according to a number of high-speed UEs using cells/beams that move with the UEs or a number of UEs using a same Wi-fi access point.

18. The non-transitory computer-readable medium of claim 11, wherein the operations further comprise grouping the identified UEs into the two or more groups of UEs according to:
- a number of UEs performing frequent measurement reporting;
- a number of UEs using the same set of beams for carrier aggregation; or
- a number of UEs requiring longer cell/beam transmission times.

19. The non-transitory computer-readable medium of claim 11, wherein the operations further comprise grouping the identified UEs into the two or more groups of UEs according to a number of UEs requiring longer DRX active times or a number of UEs performing tracking area registration at the same time.

* * * * *